United States Patent [19]

Shah et al.

[11] Patent Number: 6,081,717

[45] Date of Patent: Jun. 27, 2000

[54] SYSTEM AND METHOD FOR COVERAGE VERIFICATION BASED UPON CELL BORDER PROBABILITY

[75] Inventors: Ali R. Shah, Dallas; George Yost, DeSoto; Hossam H'mimy, Richardson, all of Tex.

[73] Assignee: Ericsson Inc., Research Triangle Park, N.C.

[21] Appl. No.: 08/985,439

[22] Filed: Dec. 5, 1997

[51] Int. Cl.[7] ........................................ H04Q 7/00
[52] U.S. Cl. .......................... 455/446; 455/67.1; 455/422
[58] Field of Search .................................. 455/67.1, 446, 455/422, 437, 517, 67.4, 423, 424

[56] References Cited

U.S. PATENT DOCUMENTS

| | | | |
|---|---|---|---|
| 5,307,510 | 4/1994 | Gunmar et al. .......................... | 455/67.1 |
| 5,465,390 | 11/1995 | Cohen ..................................... | 455/446 |

OTHER PUBLICATIONS

Six page article entitled "Models and Methodology of Coverage Verification in Cellular Systems," by Ali R. Shah. Hossam H'mimy and George Yost, 48th IEEE Vehicular Technology Conference, Westin Hotel, Ottawa Canada, May 18–21, 1998.

Bernardin, Pete, et al., "Estimating the Range to the Cell Edge from Signal Strength Measurements" *IEEE Transactions on Vehicular Technology*, Aug 1996.

Paragraph 2.5.2 of "Large–Scale Variations of the Average Signal" *Mobile Radio Propagation*, pp. 125–126.

Hess, G.C., "Verification of Coverage" *IEEE* 1997.

Hill, Casey, et al., "A Statistical Analysis of Radio System Coverage Acceptance Testing" *IEEE Vehicular Technology Society News*, Feb. 1994.

"Urban transmission loss models for mobile radio in the 900– and 1,800–MHz bands" (Revision 2) European Cooperation in the Field of Scientific and Technical Research ("COST"), Sep. 1991.

Hata, Masaharu, "Empirical Formula for Propogation Loss in Land Mobile Radio Services" *IEEE Transactions on Vehicular Technology*, Aug. 1980.

Thatcher, F.A., et al., "Method of Specifying Propogation Reliability and Recommended Test Procedure to Assure Compliance" *IEEE* 1992.

Schaefer, Fred J., "Coverage Measurement Techniques for Cellular Systems" *IEEE* 1986.

Abbas, A. Aun, et al., "On Understanding the Nature of Slow Fading in LOS Microcellular Channels".

*Primary Examiner*—Reinhard J. Eisenzopf
*Assistant Examiner*—Lester G. Kincaid
*Attorney, Agent, or Firm*—Jenkens & Gilchrist

[57] ABSTRACT

A method for verifying coverage area by measuring the signal strength throughout the area, estimating the radius of the area based on the measurements, measuring the signal strength at the estimated radial distance, and determining if there is a sufficient proportion of signals at the estimated radial distance with a strength which exceeds a threshold.

14 Claims, 7 Drawing Sheets

SYSTEM AND METHOD FOR COVERAGE VERIFICATION BASED UPON CELL BORDER PROBABILITY

BACKGROUND OF THE PRESENT INVENTION

1. Field of the Invention

The present invention relates generally to systems and methods for measuring coverage area in wireless communications systems and specifically to systems and methods for coverage verification based upon cell border probability.

2. Background of the Present Invention

Verification of coverage plays an important role in the design of wireless communications systems. For example, when a subscriber using a mobile station in a wireless telecommunication system moves from one cell to another cell, coverage by the new base transceiver station must be verified prior to the asynchronous handover. Verifying the coverage area of the base transceiver stations is also essential to selecting the locations to place the base transceiver stations within the telecommunication system which results in the most efficient resource allocation. For example, placing the base transceiver stations too close together results in a smaller coverage area for the wireless communications system as a whole. On the other hand, placing the base transceiver stations too far apart results in a discontinuous coverage area. Therefore, placement of the base transceiver stations in locations which results in the maximum continuous area requires verification of coverage for the base transmitters in the wireless communications system.

Referring now to FIG. 1 of the drawings, an exemplary wireless network, such as a Global System for Mobile Communication (GSM) Public Land Mobile Network (PLMN) 10, will be described. The PMLN 10 is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

With further reference to FIG. 1, the PLMN Service Area or wireless network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

The MSC 14 is in communication with at least one Base Station Controller (BSC) 23, which, in turn, is in contact with at least one Base Transceiver Station (BTS) 24. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25. The BTS 24 is the physical equipment, illustrated for simplicity as a radio tower, that provides radio coverage to the geographical part of the cell 22 for which it is responsible. In ascertaining the geographical area of the cell 22, the cell 22 is assumed to be a circular area with a radius R and with the BTS 24 at the center.

Coverage is defined in terms of the cell border probability (CBP) which is the probability that the strength of a randomly selected received signal along the perimeter of cell 22 exceeds a certain threshold and the cell area probability (CAP), which is the probability that the strength of a randomly selected received signal in the cell 22 exceeds a certain threshold. Coverage is verified when the CAP exceeds a desired level, e.g., 90%. One method of estimating the CAP is to take a sample of received signal strength measurements throughout the cell 22 and computing the fraction of measurements satisfying the threshold. However, in order to acquire a statistically meaningful sample, not only must a large number of measurements be taken, but the measurements must be taken at locations spread out over the area of the cell 22. Another approach is to take samples from a single area and utilize Reudink's equation to model the entire cell 22. However, use of Reudink's equation to model the cell 22 requires the estimation of certain parameters such as the propagation constant and the intercept. Consequently, the possibility of errors in the estimation of the parameters increases the likelihood of erroneous results.

It is therefore an object of the invention to provide a system and method for verifying coverage of a cell in a manner that reduces the number of measurements that must be taken.

It is also an object of the invention that the system and method verify coverage of the cell in a manner that reduces the areas in which measurements must be taken.

It is also an object of the invention to increase the probability of an accurate resultant determination.

SUMMARY

The present invention is directed to a method for verifying coverage area of a transceiver in a wireless communications system by measuring the signal strength throughout the area, estimating the radius of the area based on the measurements, measuring the signal strength at the estimated radial distance, and determining if there is a sufficient proportion of signals at the estimated radial distance with a strength which exceeds a threshold.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 2:
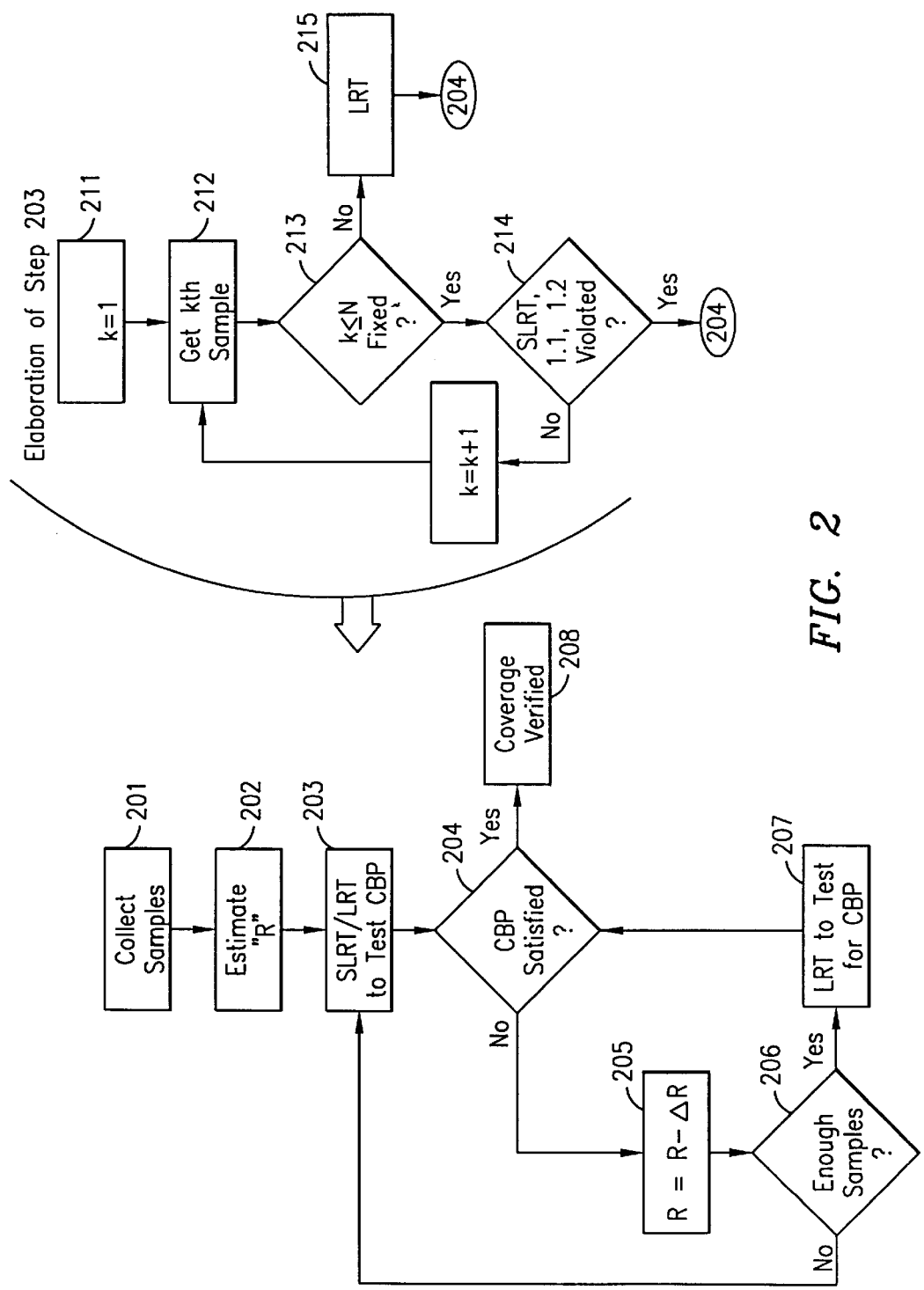
FIG. 2 is a flow chart illustrating a sample process embodying the present invention.

With reference now to FIG. 2, steps in a sample process for verifying coverage of cell 22 by BTS 24 are illustrated. The process begins by sampling and collecting the strength of the received signals at various radii from the BTS 24 (step 201).

Figure 2A:
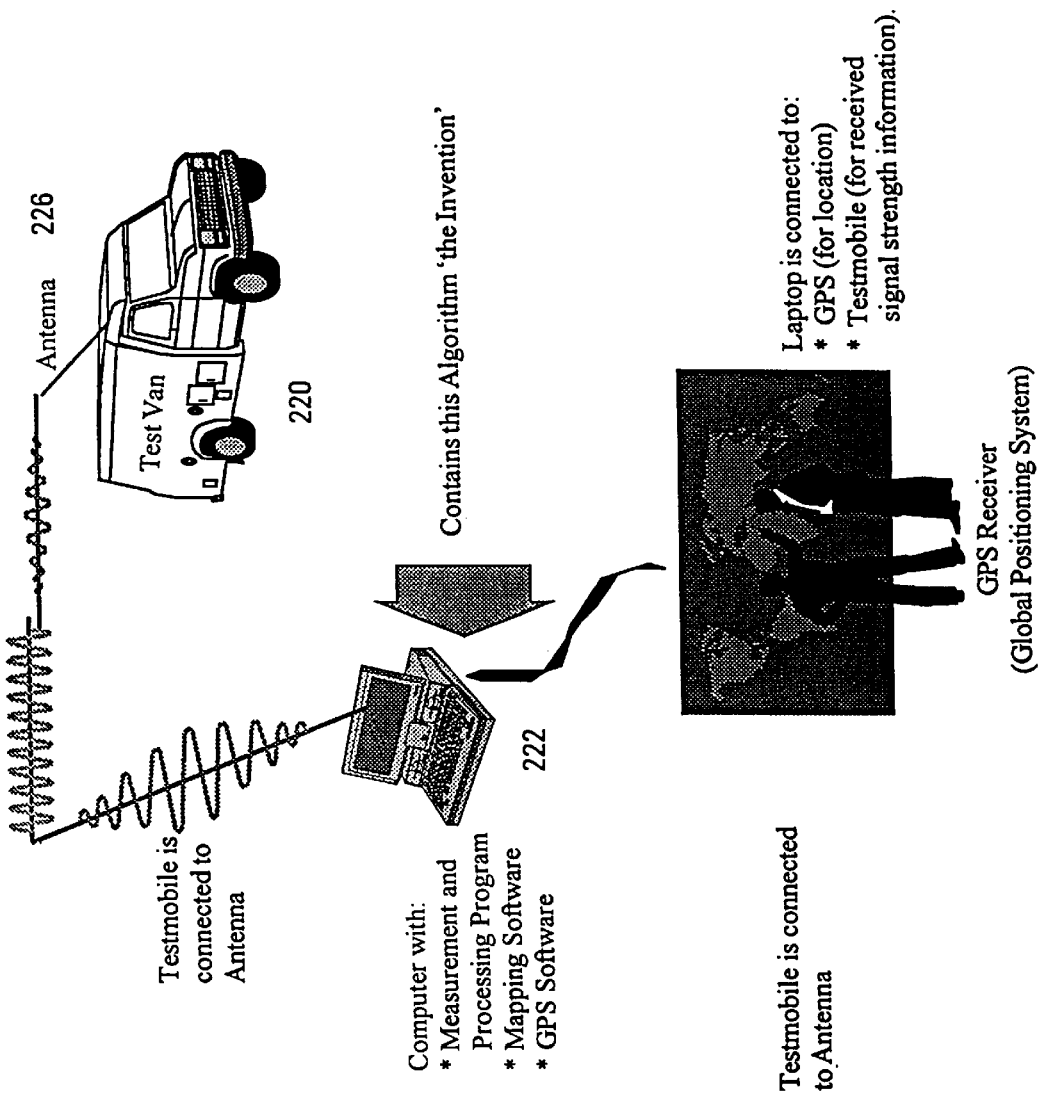
FIG. 2A illustrates a test vehicle with a computer embodying the present invention.

Referring to FIG. 2A, a test vehicle 220 containing a computer 222 with the measurement software and a processing algorithm are described. The computer 222 also has mapping software that utilizes a Global Positioning System (GPS) for location. The computer 222 is connected to a test mobile to measure signal strength which in turn is connected to an antenna 226.

Figure 2B:
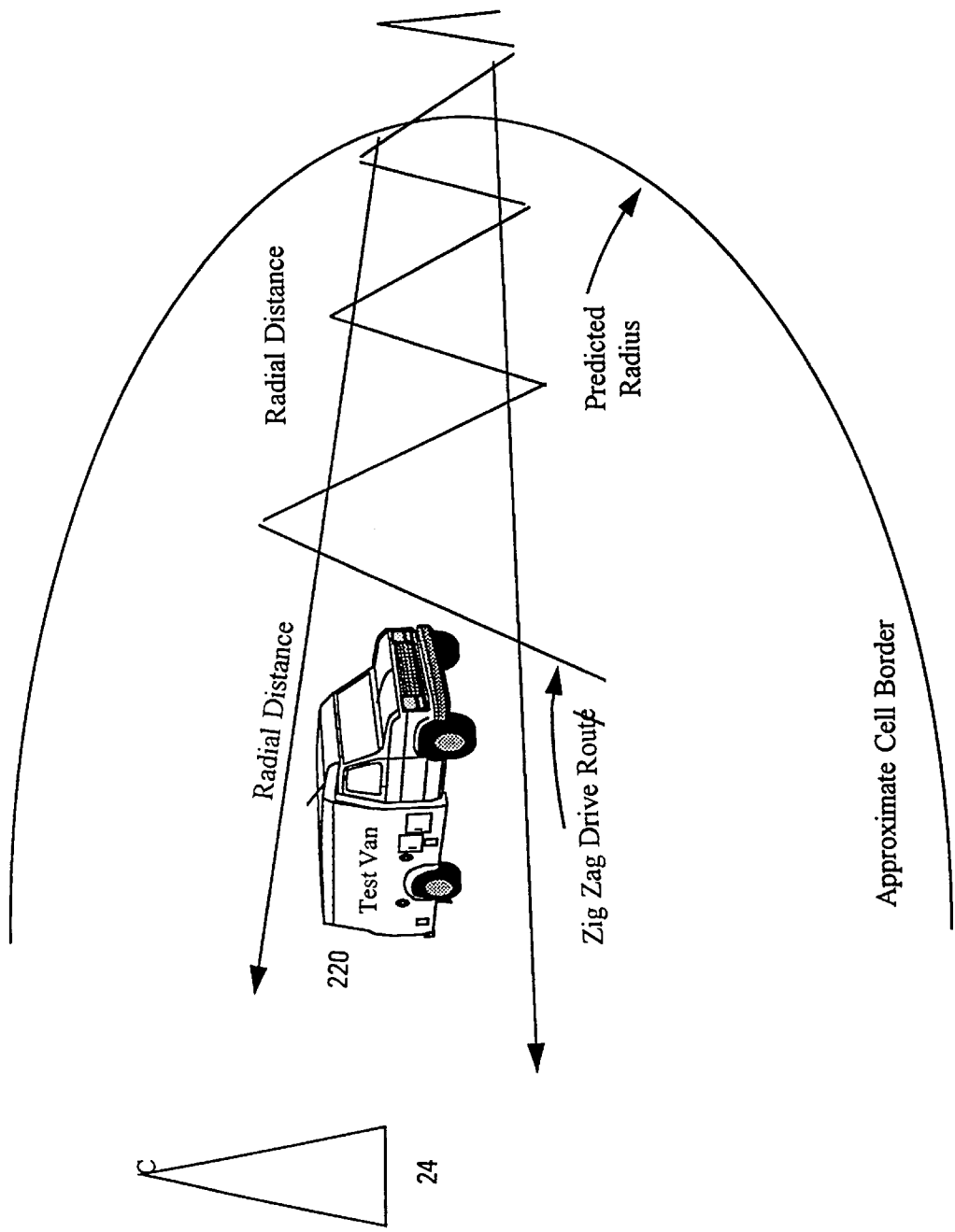
FIG. 2B illustrates a drive route of the test vehicle.

FIG. 2B specifies the drive route. The test vehicle starts from 1 km of the BTS antenna and is driven in a zig-zag fashion such that the coverage finally decreases to the extent that contact is lost with the BTS. At least 1000 data points need to be collected in this interval. A plot of the sampled signal strengths, as a function of the radius, such as FIG. 3, is generated using measurement software executed by computer 222.

Figure 1:
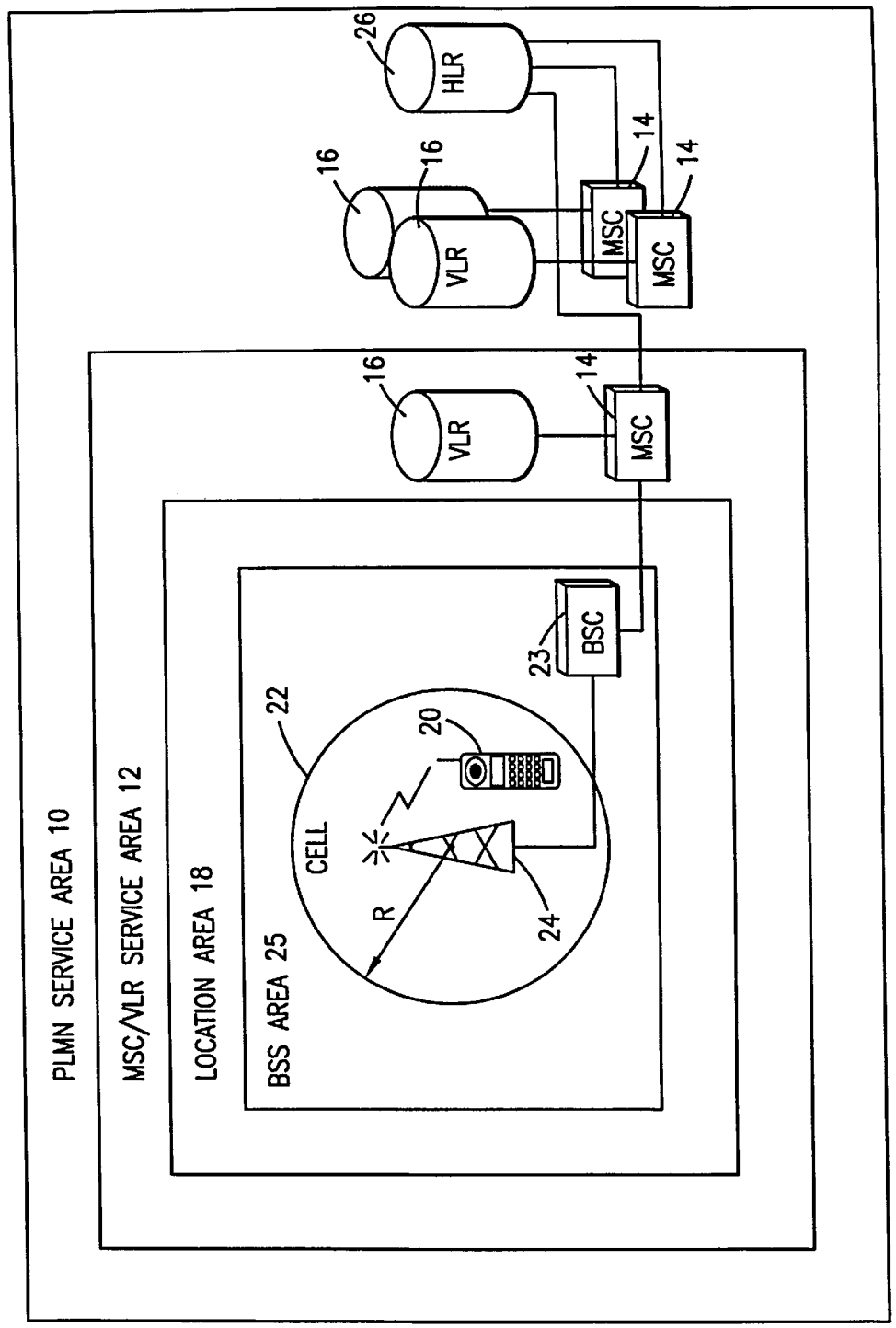
FIG. 1 is a block diagram of a conventional terrestrially-based wireless telecommunications system.
Figure 3:
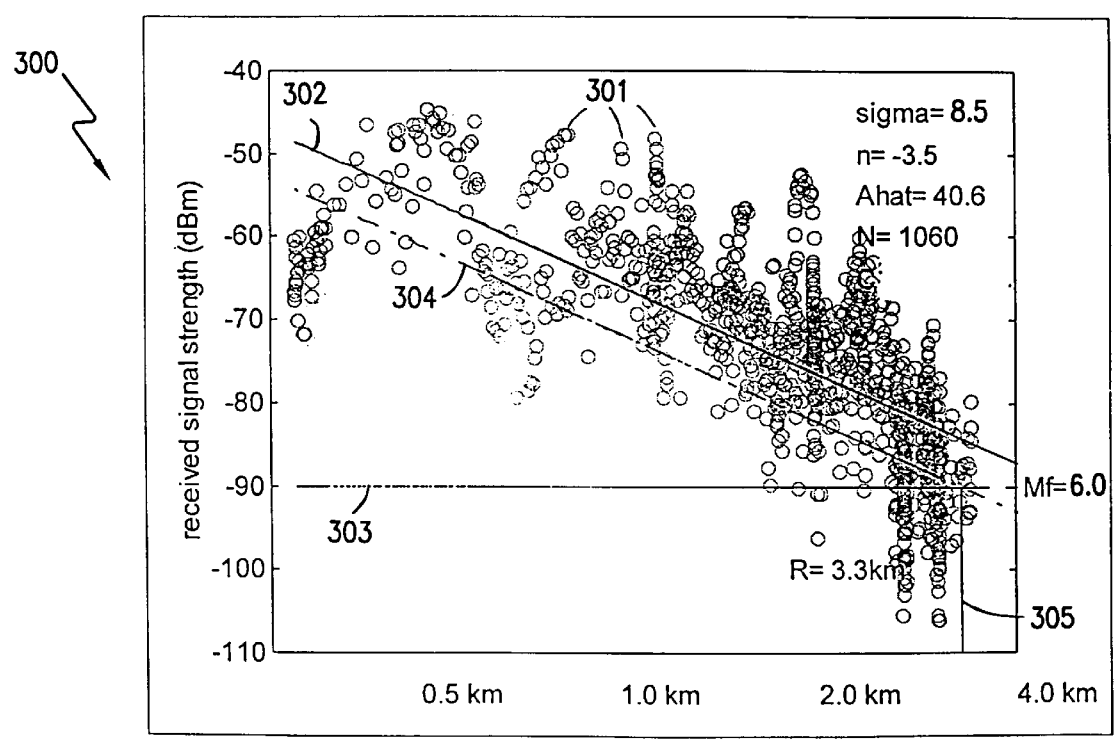
FIG. 3 is an exemplary illustration of the measured signal strength plotted as a function of distance from the cell site, used to determine the radius.

Referring now to FIG. 3, which will be discussed in connection with FIGS. 1 and 2, an exemplary illustration of a plot 300 used to estimate the hypothetical cell radius (step 202) is described. The vertical axis represents the received signal strength measured in what is known in the art as dBm where the 'm' in dBm signifies the comparison with respect to 1 milliwatt of power. The horizontal axis represents the radial distance from the BTS 24. From the plotted sample measurements, a portion of which are designated by the reference numeral 301, a mean line 302 is derived by the processing algorithm executed by computer 222, which utilizes what is known in the art as Linear Regression. Linear Regression is a data analysis technique that determines a curve, in this case a straight line, which describes the data with minimum mean squared error.

The mean line 302 is an estimation of the mean value of the measured samples as a function of the radial distance. The slope, n, of the mean line 302, is known as the base station antenna propagation constant. The coordinate plane 300 also contains a threshold line 303 which designates the level of the threshold against which the CAP/CBP are estimated. The point where the threshold line 303 and the mean line 302 intersect is the radius. Theoretically there is a 50% probability that the strength of the received signal exceeds the threshold. In order to achieve higher probability a fade margin, $M_{fade}$ is used.

To determine the radius of the cell 22 for which the desired CAP is acquired, the appropriate fade margin must be determined. The appropriate fade margin can be determined by utilizing Reudink's equation:

$$CAP = \frac{1}{2}\left[1 + \mathrm{erf}(a) + \exp\left(\frac{2ab+1}{b^2}\right)\left\{1 - \mathrm{erf}\left(\frac{ab+1}{b}\right)\right\}\right]$$

$$\text{where } a = \frac{M_{fade}}{\sigma\sqrt{2}} \text{ and } b = \frac{10n\log_{10}e}{\sigma\sqrt{2}}$$

which defines the relationship between the propagation constant, n, standard deviation of the measurements from the mean line 302 (it is assumed to be independent of the distance from the BTS antenna) σ, fade margin $M_{fade}$, and the CAP. The symbol "erf" is known as the error function, while the symbol "exp" is known as the exponential.

TABLE 1

| Fade margins ($M_{fade}$) for a CAP = 90% and n = 2.5 – 3.7 | | | | | | | |
|---|---|---|---|---|---|---|---|
| σ (dB) | n-> | 2.5 | 2.7 | 2.9 | 3.1 | 3.3 | 3.5 | 3.7 |
| 6 | ($M_{fade}$) | 4.2 | 4 | 3.8 | 3.7 | 3.5 | 3.3 | 3.2 |
| 6.5 | | 4.8 | 4.6 | 4.4 | 4.2 | 4 | 3.9 | 3.7 |
| 7 | | 5.3 | 5.1 | 4.9 | 4.7 | 4.6 | 4.4 | 4.2 |
| 7.5 | | 5.9 | 5.7 | 5.5 | 5.3 | 5.1 | 4.9 | 4.7 |
| 8 | | 6.5 | 6.2 | 6 | 5.8 | 5.6 | 5.5 | 5.3 |
| 8.5 | | 7 | 6.8 | 6.6 | 6.4 | 6.2 | 6 | 5.8 |
| 9 | | 7.6 | 7.4 | 7.2 | 7 | 6.7 | 6.6 | 6.4 |
| 9.5 | | 8.2 | 8 | 7.7 | 7.5 | 7.3 | 7.1 | 6.9 |
| 10 | | 8.8 | 8.6 | 8.3 | 8.1 | 7.9 | 7.7 | 7.5 |
| 10.5 | | 9.4 | 9.1 | 8.9 | 8.7 | 8.5 | 8.2 | 8 |
| 11 | | 10 | 9.7 | 9.5 | 9.3 | 9 | 8.8 | 8.6 |

Table 1 is an exemplary table of values for $M_{fade}$, based on standard deviation a and propagation constant n, to achieve a CAP of 90%. It should be noted that the CAP of 90% is an arbitrarily chosen value for the present example and in another example, the design requirements may demand a different CAP. Where the propagation constant= 3.5, and where the standard deviation=8.5 dBm, in order to achieve a CAP of 90% a fade margin of 6 dB is required. The computations to determine the $M_{fade}$ can be performed by the computer 222 executing a routine embedded in the processing algorithm.

With the fade margin determined, a fade margin line 304 is drawn on the plot 300. The fade margin line 304 is derived by reducing the mean line 302 by the fade margin. The fade margin line 304 intersects the threshold line 303 at a hypothetical radius 305, which is the hypothetical radius of cell 22 where the CAP is at the desired level. The computations to determine the hypothetical radius can also be performed by the computer 222 executing a routine embedded in the processing algorithm.

The CAP of cell 22 is evaluated by empirically verifying the cell border probability (CBP) of cell 22 (step 203). The CBP is defined as the probability that a strength of a measured signal in the neighborhood of the border, or hypothetical radius, exceeds a threshold. The CBP is easier to empirically verify compared with CAP since a smaller area has to be sampled. The CBP is related to the fade margin and therefore to the CAP by the following equation:

$$CBP = \frac{1}{2} + \frac{1}{2}\text{erf}\left(\frac{M_{fade}}{\sigma\sqrt{2}}\right)$$

Recall that $M_{fade}$ is chosen to permit a desired CAP. Therefore, with a required fade margin of 6 dB, and a standard deviation of 8.5 dB, a CAP of 90% can be verified by establishing that the CBP is at least 76%.

Figure 2C:
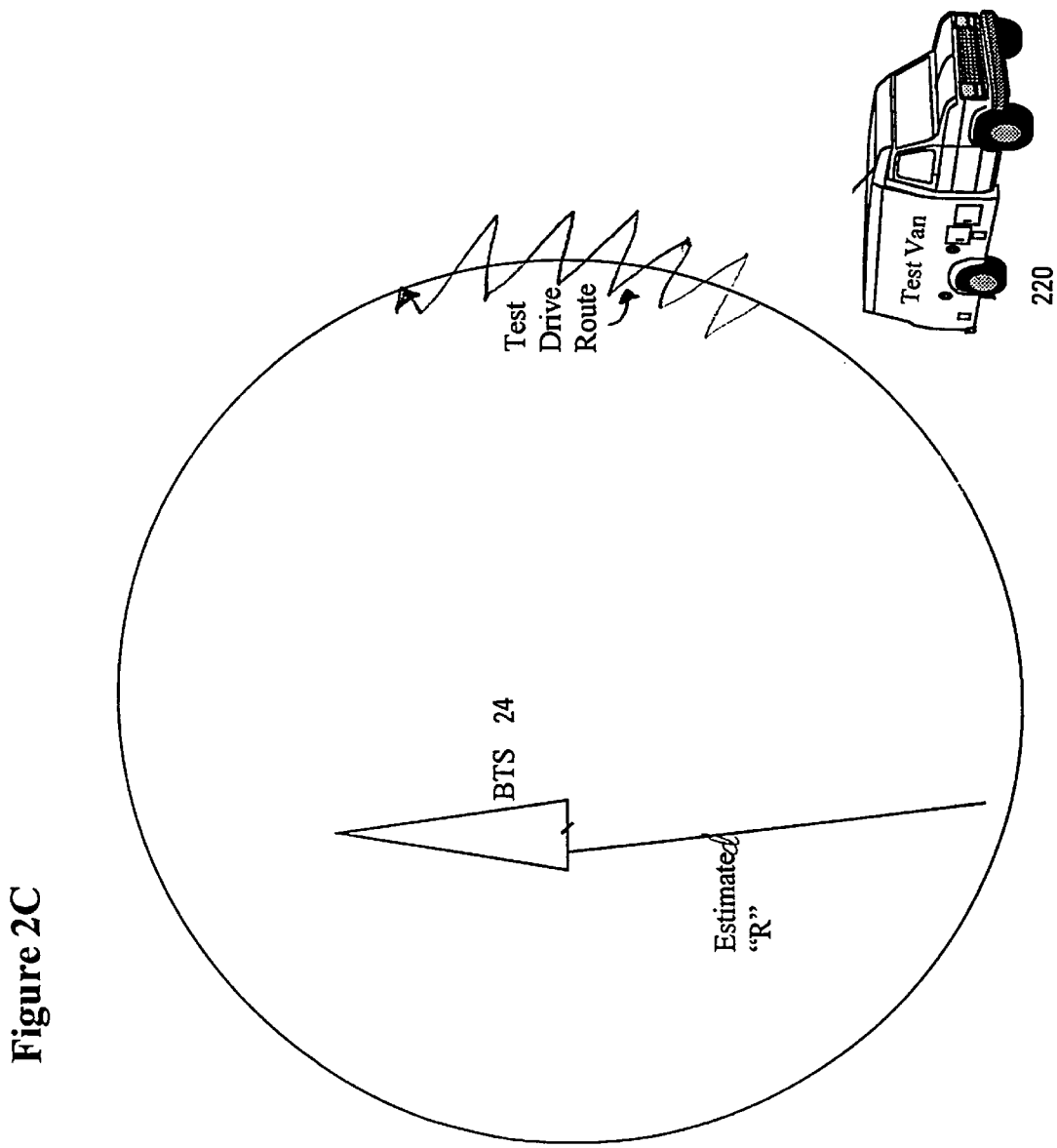
FIG. 2C illustrates a test drive route for Cell Border Probability verification.

At this state, a radial test drive is initiated such that the CBP is verified. A typical test drive route for the CBP verification is illustrated in FIG. 2C. The CBP is verified using what is known as the sequential likelihood ratio test. Two hypotheses are established to verify the CBP:

$H_1$: p>cbp+$\Delta$ $H_2$: p<cbp-$\Delta$ where $\Delta$ is a small quantity greater than zero. We denote probability of a type I error (erroneously choosing $H_1$ over $H_2$) as $\alpha$, and the probability of a type II error (erroneously choosing $H_2$ over $H_1$) as $\beta$. The parameters $\alpha$ and $\beta$ are chosen by the cell designer.

Samples are measured in the neighborhood of the radius, and a statistic $\bar{x}$ is calculated.

$$\bar{x} = \frac{1}{N}\sum_k x_k$$

where:

$x_k$=1, if the kth sampled signal>threshold 0, if the kth sampled signal<threshold N=number of samples taken Samples are continuously taken until one of the following inequalities is violated:

$$\bar{x} > c_n = \frac{\frac{\ln(c)}{N} - \ln\left(\frac{1-cbp-\Delta}{1-cbp+\Delta}\right)}{\ln\left(\frac{(cbp+\Delta)(1-cbp+\Delta)}{(cbp-\Delta)(1-cbp-\Delta)}\right)}; \text{ where } c = \frac{1-\beta}{\alpha} \quad 1.1$$

$$\bar{x} < d_n = \frac{\frac{\ln(d)}{N} - \ln\left(\frac{1-cbp-\Delta}{1-cbp+\Delta}\right)}{\ln\left(\frac{(cbp+\Delta)(1-cbp+\Delta)}{(cbp-\Delta)(1-cbp-\Delta)}\right)}; \text{ where } d = \frac{\beta}{1-\alpha} \quad 1.2$$

and $cbp$ = desired cell border probability $$N \leq N_{Axed} = \left(\frac{\Phi^{-1}(1-\beta)}{\gamma^* - cbp - \Delta}\right)^2 (cbp+\Delta)(1-cbp-\Delta); \quad 1.3$$

where $$\gamma^* = \frac{cbp + \Delta + \frac{\sqrt{(cbp+\Delta)(1-cbp-\Delta)}}{\sqrt{(cbp-\Delta)(1-cbp+\Delta)}}(cbp-\Delta)}{1 + \frac{\sqrt{(cbp+\Delta)(1-cbp-\Delta)}}{\sqrt{(cbp-\Delta)(1-cbp+\Delta)}}};$$

and $$\Phi(x) = \frac{1}{2} + \frac{1}{2}\text{erf}\left(\frac{x}{\sqrt{2}}\right)$$

Figure 4:
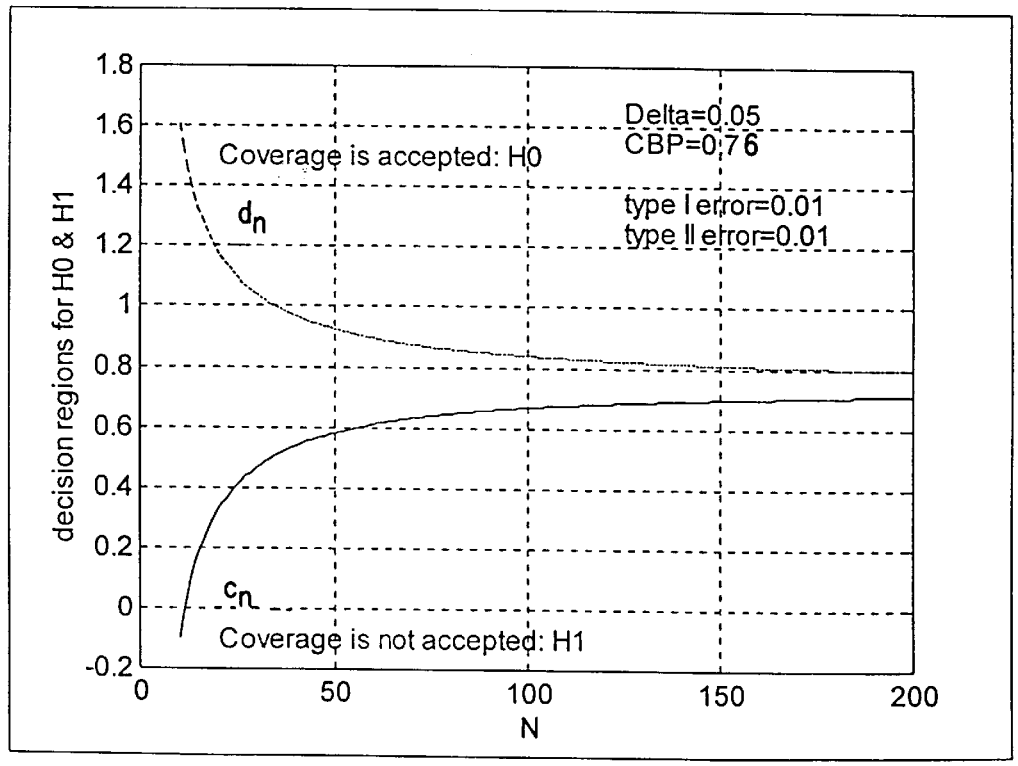
FIG. 4 is an exemplary illustration of the decision boundaries for hypothesis selection.

FIG. 4 is an exemplary graph of $c_N(n)$, and $d_N(n)$ for $\Delta$=0.05, Cbp=0.76, $\alpha$=0.01, and $\beta$=0.01.

At the point when one of the inequalities is violated, a decision is made whether the CBP is satisfied or not (step 204). If inequality 1.1 is violated, then the CBP is lower than required. The radius is incrementally reduced (step 205) and the number of measurements samples are checked (step 206). If there are enough samples for a Likelihood Ratio Test, (i.e.: inequality 1.3 is violated) an LRT, is used to check the CBP (step 204) for the reduced radius R. If not enough samples are available then the SLRT/LRT test is repeated to verify the CBP of the reduced radius (step 203)i If inequality 1.2 is violated, then the CBP is satisfactory and the cell planner can consider coverage to be acceptable (step 208). If the number of measurements for the SLRT in 203 exceeds $N_{fixed}$ (inequality 1.3), then an LRT is used to check CBP. (See elaboration of step 203).

With further reference to step 203, the SLRT/LRT are implemented as follows. Starting at k=1, the kth measurement is obtained (step 212). If k is less than $N_{fixed}$ (step 213), the SLRT is employed and inequalities 1.1 and 1.2 (step 214). If neither are violated, another sample is collected (step 212). If either are violated, then step 203 is exited. If K exceeds $N_{fixed}$ (at step 213), an LRT test is performed (step 215) and step 203 is exited.

As will be recognized by those skilled in the art, the innovative concepts described in the present application can be modified and varied over a wide range of applications. For example, it should be noted that the aforedescribed invention can be implemented in any wireless signaling system, and should not be limited to GSM systems. It should also be noted that whether the cell border probability is sufficient can be determined by a number of alternative approaches. Accordingly, the scope of the patent subject matter should not be limited to any of the specific exemplary teachings discussed, but is only limited by the following claims.

What is claimed is:

1. A method for measuring an area surrounding a transceiver, said area receiving a plurality of signals transmitted from said transceiver wherein at least a predetermined proportion of said plurality of signals have a strength exceeding a predetermined threshold, said method comprising the steps of:

measuring, at a multiplicity of locations within said area, the strength of a multiplicity of signals;

estimating a radius of said area, responsive to said measuring step;

measuring the strength of a second multiplicity of signals at a perimeter, said perimeter comprising a plurality of locations at a distance from said transceiver substantially equivalent to said radius; and determining, after each of said perimeter measurements, whether a sequential likelihood ratio test is triggered;

for a determination that said sequential likelihood ratio test is triggered, determining whether cell border probability is acceptable; and otherwise, measuring a subsequent signal at said perimeter and repeating said step of determining whether a sequential likelihood ratio test is triggered.

2. The method of claim 1, further comprising the step of reducing said radius, when said cell border probability does not exceed a predetermined acceptable probability.

3. The method of claim 2, wherein said step of reducing said radius further comprising the step of determining whether said second multiplicity of measured samples are sufficient for a likelihood ratio test of said reduced radius;

for a determination that said multiplicity of measured samples are insufficient, measuring the strength of a subsequent signal at said perimeter and repeating said step of determining whether a sequential likelihood ratio test is triggered; and otherwise, performing said likelihood ratio test.

4. The method of claim 1, wherein said step of measuring the strength of said second multiplicity of signals at said perimeter further includes the step of determining the number of perimeter measurements:

for a determination that said number exceeds a predetermined value, performing a likelihood ratio test; and otherwise, continuing to said step of determining whether said sequential likelihood ratio test is triggered.

5. The method of claim 1, wherein said step of measuring the strength of said second multiplicity of signals at said perimeter further comprises the step of determining a mean value for said multiplicity of signals at said perimeter.

6. The method of claim 5, wherein said step of determining whether a sequential likelihood ratio test is triggered further comprises the step of:

determining a lower and an upper threshold for said sequential likelihood ratio test.

7. The method of claim 6, wherein said sequential likelihood ratio test is triggered when said mean value is determined to be less than said lower threshold or greater than said upper threshold.

8. The method of claim 7, wherein said lower and upper threshold are defined by:

$$\text{lower} = \frac{\frac{\ln(c)}{N} - \ln\left(\frac{1 - cbp - \Delta}{1 - cbp + \Delta}\right)}{\ln\left(\frac{(cbp + \Delta)(1 - cbp + \Delta)}{(cbp - \Delta)(1 - cbp - \Delta)}\right)}$$

$$\text{upper} = \frac{\frac{\ln(d)}{N} - \ln\left(\frac{1 - cbp - \Delta}{1 - cbp + \Delta}\right)}{\ln\left(\frac{(cbp + \Delta)(1 - cbp + \Delta)}{(cbp - \Delta)(1 - cbp - \Delta)}\right)}$$

wherein N equals a number of perimeter samples taken and cbp equals said cell border probability.

9. A system for measuring an area surrounding a transceiver, said area receiving a plurality of signals transmitted from said transceiver wherein at least a predetermined proportion of said plurality of signals have a strength exceeding a predetermined threshold, said system comprising:

a test vehicle for measuring, at a multiplicity of locations within said area, the strength of a multiplicity of signals;

a computer for estimating a radius of said area, responsive to said measurements taken by said test vehicle, wherein said test vehicle measures the strength of a second multiplicity of signals at a perimeter, said perimeter comprising a plurality of locations at a distance from said transceiver substantially equivalent to said radius;

said computer further for determining, after each of said perimeter measurements, whether a sequential likelihood ratio test is triggered;

for a determination that said sequential likelihood ratio test is triggered, determining whether cell border probability is acceptable; and otherwise, measuring a subsequent signal at said perimeter and repeating said step of determining whether said sequential likelihood ratio test is triggered.

10. The system of claim 9, wherein said computer reduces said radius, when said cell border probability does not exceed a predetermined acceptable probability.

11. The system of claim 9, wherein said computer determines a mean value for said second multiplicity of signals at said perimeter.

12. The system of claim 11, wherein said computer determines a lower and an upper threshold for said sequential likelihood ratio test.

13. The system of claim 12, wherein said sequential likelihood ratio test is triggered when said mean value is determined to be less than said lower threshold or greater than said upper threshold.

14. The system of claim 13, wherein said lower and upper threshold are defined by:

$$\text{lower} = \frac{\frac{\ln(c)}{N} - \ln\left(\frac{1 - cbp - \Delta}{1 - cbp + \Delta}\right)}{\ln\left(\frac{(cbp + \Delta)(1 - cbp + \Delta)}{(cbp - \Delta)(1 - cbp - \Delta)}\right)}$$

$$\text{upper} = \frac{\frac{\ln(d)}{N} - \ln\left(\frac{1 - cbp - \Delta}{1 - cbp + \Delta}\right)}{\ln\left(\frac{(cbp + \Delta)(1 - cbp + \Delta)}{(cbp - \Delta)(1 - cbp - \Delta)}\right)}$$

wherein N equals a number of perimeter samples taken and cbp equals said cell border probability.

* * * * *